INVENTOR.
OTTO A. GUTWIN

BY Edward G. Fiorito

ATTORNEY

United States Patent Office 3,451,047
Patented June 17, 1969

3,451,047
ECCENTRIC MAGNETIC CORE
Otto A. Gutwin, Crugers, N.Y., assignor to International Business Machines Corporation, New York, N.Y., a corporation of New York
Filed Aug. 30, 1963, Ser. No. 305,647
Int. Cl. G11b 5/02
U.S. Cl. 340—174 10 Claims

ABSTRACT OF THE DISCLOSURE

The magnetic memory core is formed of ordinary square loop magnetic material. The core is provided with an input winding for switching the core between its storage states and an output, or sense winding, for producing outputs when the core is interrogated. The core itself includes only a single aperture and this aperture is offset from the center of the core so that the minimum wall thickness at one side of the aperture is at least 10% less than the maximum wall thickness on the other side of the aperture. This type of core with the aperture eccentrically arranged, as described above, can be switched between its binary storage states at a faster rate than cores which are symmetrical and have the same annular thickness throughout.

This invention relates to magnetic cores used in digital computers, and more particularly to the switching characteristics of such cores.

Magnetic cores have been found to be useful for storing binary information due to their bistable square hysteresis loop characteristic. Information is stored in a core by switching the core from one stable magnetic state to another. The speed of operation of the core is dependent upon the time taken for the core to switch from one stable state to another.

In digital computer memories, large numbers of cores are arranged in arrays. Read out and read in of the array are frequently accomplished in sequential fashion so that the time taken to switch the cores is cumulative, adding to the overall operation time of the memory. Therefore, it becomes of critical importance to cut down the switching time of the individual cores in order to improve the speed of operation of the memory.

The switching coefficient, which is a figure of merit for the switching speed of magnetic cores, has been thought to be a constant which depends upon the properties of the material in the core, see for example "Magnetic Materials for Digital-Computer Components," by N. Menyuk and J. B. Goodenough, Journal of Applied Physics, volume 26, No. 1, January 1955. However, it has been discovered that improved switching coefficients can be achieved by proper structural design of the core.

Core memories frequently employ coincident selection as a technique for switching cores in the memory. For this operation, the core must switch in response to two units of drive current, but not in response to a single unit. Therefore, it is desirable for a core to have a sufficiently high switching threshold so that the core can distinguish between the application of one or two units of drive current. Further it is desirable for the core to swiich rapidly in response to that portion of the drive current which exceeds the switching threshold.

It is an object of the present invention to provide an improved memory core having a reduced switching coefficient.

A further object of the present invention is to provide an improved memory core capable of switching rapidly in response to the drive current which exceeds the threshold value.

Still another object of the present invention is to provide an improved single aperture core.

These and other objects of the present invention are accomplished by constructing the core in a unique configuration. The annular wall thickness of the core is made non-uniform about a single aperture. A reduced switching coefficient is exhibited by such a core as compared to a core of the same material and having a conventional toroidal shape.

A further feature of the cores constructed in accordance with the present invention is the simplicity of design and similarity to conventional toroidal cores which permit fabrication without extensive modification of existing core manufacturing processes.

The foregoing and other objects, features and advantages of the invention will be apparent from the following more particular description of preferred embodiments of the invention, as illustrated in the accompanying drawings.

Figure 1:
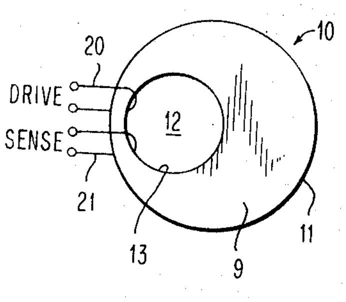
FIG. 1 is a diagrammatic view of a core constructed in accordance with the present invention.

Core 10 of FIG. 1 is constructed in accordance with the present invention. The core 10 is in the form of a magnetic disc having a uniform thickness. An outer circumference 11 forms one boundary for the annular wall 9 of the core 10. An aperture 12 extends through the core forming an inner circle 13 which provides another boundary for the annular wall 9 of the core 10. The aperture 12 is eccentrically located with respect to the center of the circumference 11 so that the annular wall 9 of the core 10 between the circumference 11 and the inner circle 13 is non-uniform.

Figure 4:
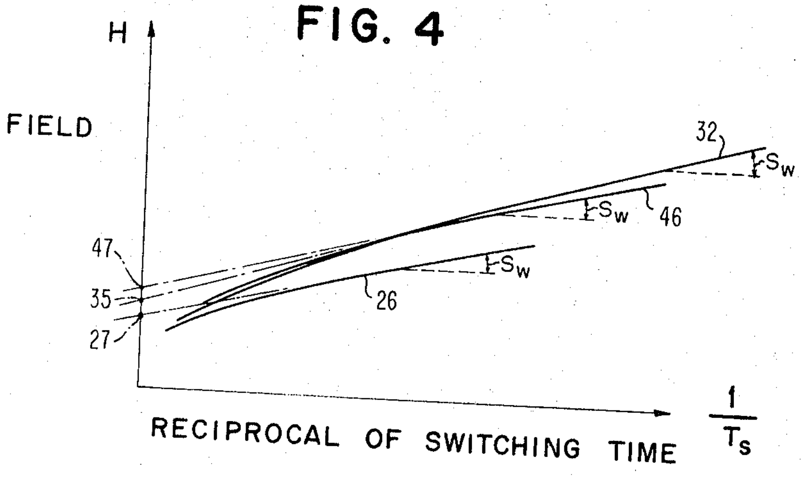
FIG. 4 is a graph illustrating the variation of the reciprocal of the switching time as a function of field intensity for the cores shown in FIGS. 1–3, the slope of the curves being defined as the switching coefficient.

In order to illustrate the improved switching characteristics of the core 10, the graph in FIG. 4 is shown. The field strength within the core 10 is plotted along the ordinate axis, while the reciprocal of the switching time $I/T_s$ is plotted along the abscissa. The field is created by applying a drive current to the drive winding 20, and the switching time is measured by appropriate means on the sense winding 21. The technique for performing the measurements is well known. An example may be found in the article by N. Menyuk et al., above. Curve 26 illustrates the results of tests performed upon core 10. The slope of the curve 26 is defined as the switching coefficient, $S_w$ for core 10. A low $S_w$ is a desirable characteristic of a core as can be seen by examining curve 26. Because of the very small slope, the curve 26 extends out along the abscissa, $I/T_s$ of the graph in FIG. 4 without a large increase in field H. For a given field H the reciprocal of the switching time, $I/T_s$ is relatively large, which in turn indicates that the core is switched in a relatively short switching time $T_s$. Therefore a core can be switched in a shorter time because the slope, $S_w$ of the curve 26 is small.

One other consideration in determining the merit of a given core configuration is the point at which a projection of the straight line portion of the curve $S_w$ intersects the ordinate axis, H. For curve 26 the intersection occurs at point 27. The magnitude of this intersection is an indication of the switching threshold of the core. As described above, the switching threshold is used to discriminate between the presence of one or two units of drive current in a coincident selection mode of operation. It is usually desirable to have a large enough intersection so that a value twice the magnitude of the intersection is located up in the high portion of the curve. Therefore the true merit of a core is given by the switching speed of the core in response to that portion of the drive current which exceeds the threshold value. Various comparisons are made below between cores constructed in accordance with the present invention and cores known in the prior art.

Figure 2:
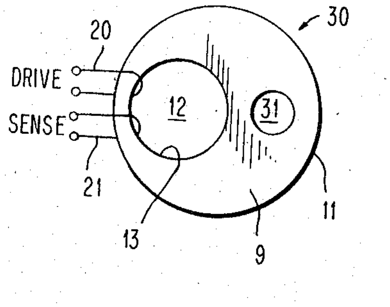
FIG. 2 is a diagrammatic view of a core constructed in accordance with the prior art.

In order to illustrate the improved characteristics of the core 10, a core 30 is shown in FIG. 2. Core 30 is identical to the core 10 in all respects (i.e. size, material, cross-section, etc.), with one exception noted below. Therefore, the same numbers are employed in FIGS. 1 and 2 where the cores 10 and 30 are identical. The single structural difference between core 30 and core 10 is the addition of a second aperture 31 extending through the thickest portion of the annular wall 9 of core 30. The core 30 is similar in structure to those found in the prior art.

Curve 32 represents the switching characteristics found to exist for the core 30. It is noted that the switching coefficient, $S_w$, is larger for core 30 than for core 10. The actual switching coefficients found for cores 10 and 30 made of the same ceramic ferrite material were .143 oersted microsecond and .190 oersted microsecond respectively. The intersections 35 for curve 32 and 27 for curve 26 were found to occur at 6.4 and 4.4 oersteds. The actual dimensions of the cores 10 and 30 used to produce the results above are as follows—

Cores 10 and 30:
- Diameter of circumference 11—0.2097 inch;
- Diameter of circle 13—0.1224 inch;
- Minimum annular wall thickness—0.006 inch;
- Maximum annular wall thickness—0.0813 inch;
- Diameter of aperture 31— 0.040 inch.

Core 30:
- Thickness between aperture 31 and circle 13—0.0158 inch, and
- Thickness between aperture 31 and circumference 11—0.0226 inch.

The above experimental results indicate that the time taken to switch core 10 is smaller than that taken for core 30 when each of the cores is impressed with the same amount of drive current in excess of its threshold valve.

Figure 3:
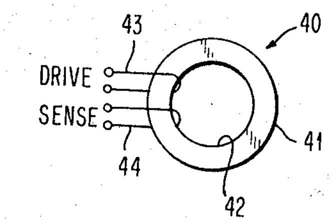
FIG. 3 is a diagrammatic view of a core constructed in accordance with the prior art.

To further demonstrate the advantageous characteristics of the core 10, core 40 is illustrated in FIG. 3. Core 40 is a conventional toroidal core having an outer circumference 41 and an inner circle 42. Signals applied to a drive winding 43 switch the core 40 and provide a signal upon a sense winding 44. The results of measurements made upon the core 40 are illustrated by curve 46, the projection of which intersects the ordinate axis at 47 in FIG. 4. The actual values obtained for a conventional toroidal core as illustrated in FIG. 3 made of the same ceramic ferrite material as cores 10 and 30 are as follows:

$S_W$—.1755 oersted microsecond;
Intersection 47—7.2 oersteds; and
The diameters of the circumference 41 and inner circle 42 are 0.082 inch and 0.046 inch respectively.

Interpretation and extrapolation of the above experimental results indicate that when the inner circles 13 and 42 of cores 10 and 40 are the same, 0.1224 inch, and a field is supplied by an equal number of ampere turns, 5.70 ampere turns, in excess of the respective threshold values, the time taken to switch core 10 is 0.020 microsecond, while the time taken to switch core 40 is 0.030 microsecond. This represents a savings of over 33% in the relative switching times of the cores due to their difference in configuration.

Figure 5:
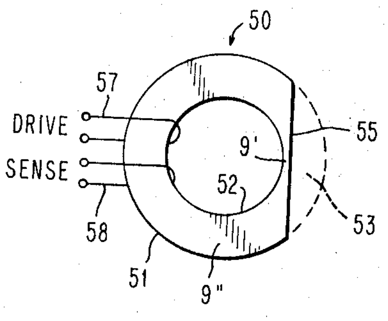
FIG. 5 is a diagrammatic view of another core constructed in accordance with the present invention.

FIG. 5 illustrates another core 50 constructed in accordance with the present invention. The core 50 is in the form of a toroid having an outer periphery 51 and an inner circle 52. A segment 53 is cut from the periphery 51. By performing measurements upon a drive and a sense winding 57 and 58 respectively, it has been found that improved switching coefficients are obtained by removing the segment 53. The minimum wall thickness 9′ of the core 50 occurs between the inner circle 52 and a chord 55 of segment 53. Noticeable improvements in the switching coefficient begin to occur when the minimum wall thickness 9′ of the core 50 is at least 10% smaller than the maximum wall thickness 9″ of the core between the periphery 51 and inner circle 52.

It is apparent by examining cores 10 and 50 that the nonuniform wall thickness of the core necessary to achieve the advantageous results of the present invention can be constructed by either eccentrically locating the aperture as in core 10, or by removing a segment of the toroidal core 50. It is also apparent that the advantages of the present invention are obtained by constructing a core having the structural attributes of both cores 10 and 50, i.e. a core having an eccentrically located aperture and a segment cut from the outer periphery.

Beside the non-uniform wall thickness of the cores 10 and 50, another common design feature is the continuous, unperforated annular shape as opposed to core 30 wherein aperture 31 interrupts the flux path about the core.

While the invention has been particularly shown and described with reference to preferred embodiments thereof, it will be understood by those skilled in the art that the foregoing and other changes in form and details may be made therein without departing from the spirit and scope of the invention.

I claim:

1. A memory core of magnetizable material exhibiting a substantially square hysteresis loop, said core having an input winding for storing information in the core and a sense winding for producing outputs indicative of the information stored, said core having a single aperture only extending therethrough and a non-uniform wall thickness between the inner and outer periphery thereof.

2. A core as defined in claim 1 wherein the minimum wall thickness is at least 10% smaller than the maximum wall thickness.

3. A memory core of magnetizable material exhibiting a substantially square hysteresis loop, said core having an input winding for storing information in the core and a sense winding for producing outputs indicative of the information stored, said core having a single aperture only extending therethrough forming an inner periphery therein, the outer periphery of said core being formed an unequal distance from said inner periphery.

4. A memory core as defined in claim 3 wherein the minimum distance between said inner and outer peripheries is at least 10% smaller than the maximum distance between said inner and outer peripheries.

5. A memory core comprising a round disc of magnetizable material exhibiting a substantially square hysteresis loop, said core having aninput winding for storing information in the core and a sense winding for producing outputs indicative of the information stored, said disc having a single aperture only which is offset from the center of said disc so that an annularly shaped core of continuous unperforated material is formed.

6. A memory core as defined in claim 5 wherein the minimum distance between the inner and outer peripheries of said core is at least 10% smaller than the maximum distance between said inner and outer peripheries.

7. A memory core comprising a round disc of magnetizable material exhibiting a substantially square hysteresis loop, said core having an input winding for storing information in the core and a sense winding for producing outputs indicative of the information stored, said disc having only a single circular aperture eccentrically located with respect to the center of said disc.

8. A memory core as defined in claim 7 wherein the degree of eccentricity is sufficient to create a minimum thickness between the inner and outer peripheries of said core which is at least 10% smaller than the maximum thickness between said inner and outer peripheries.

9. A memory core comprising a magnetizable material exhibiting a substantially square hysteresis loop, said core having an input winding for storing information in the core and a sense winding for producing outputs indicative of the information stored, said core being in the shape of a toroid having a single aperture only and having a segment removed from the outer periphery of said torroid.

10. A memory core as defined in claim 9 wherein the minimum distance between the chord of said segment and the inner periphery of said toroid is at least 10% smaller than the distance between the inner and outer peripheries of said toroid.

References Cited

UNITED STATES PATENTS

| | | | |
|---|---|---|---|
| 1,774,856 | 9/1930 | Van Deventer. | |
| 2,799,822 | 7/1957 | Dewitz | 323—89 |
| 2,918,660 | 12/1959 | Chen et al. | 340—174 |
| 3,157,866 | 11/1964 | Lien | 340—174 |
| 3,303,449 | 2/1967 | Stimler | 336—213 |
| 1,875,590 | 9/1932 | Green | 336—174 |

OTHER REFERENCES

Hottenrott, H. G.: Improvements in Magnetic Cores, IBM Technical Disclosure Bulletin, vol. 3, No. 11, August 1960.

STANLEY M. URYNOWICZ, Jr., *Primary Examiner.*

U.S. Cl. X.R.

336—220, 233